US012766752B2

(12) United States Patent
Haucourt et al.

(10) Patent No.: US 12,766,752 B2
(45) Date of Patent: Oct. 20, 2026

(54) METHOD AND MACHINE FOR CUTTING DRAPERY ELEMENTS

(71) Applicant: SAFRAN NACELLES, Gonfreville l'Orcher (FR)

(72) Inventors: Boris Haucourt, Moissy-Cramayel (FR); Hugo Boistelle, Moissy-Cramayel (FR); Benjamin Persyn, Moissy-Cramayel (FR); Eric Pillon, Moissy-Cramayel (FR); Yanhaël Labat, Moissy-Cramayel (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 491 days.

(21) Appl. No.: 17/753,458

(22) PCT Filed: Sep. 3, 2020

(86) PCT No.: PCT/FR2020/051529
§ 371 (c)(1),
(2) Date: Mar. 3, 2022

(87) PCT Pub. No.: WO2021/044103
PCT Pub. Date: Mar. 11, 2021

(65) Prior Publication Data

US 2022/0324129 A1 Oct. 13, 2022

(30) Foreign Application Priority Data

Sep. 6, 2019 (FR) ....................................... 1909810

(51) Int. Cl.
*B26D 5/00* (2006.01)
*B26F 1/38* (2006.01)
*B29C 70/04* (2006.01)

(52) U.S. Cl.
CPC .............. *B26D 5/00* (2013.01); *B26F 1/3813* (2013.01); *B29C 70/04* (2013.01)

(58) Field of Classification Search
CPC . B26D 5/00; B26F 1/3813; B26F 1/38; B29C 70/04; B29C 70/545; G05B 19/41
See application file for complete search history.

(56) References Cited

U.S. PATENT DOCUMENTS 3,881,379 A * 5/1975 Stumpf ................ B23Q 35/128 83/365
4,538,233 A * 8/1985 Resnick ................ G05B 19/41 901/14
(Continued)

FOREIGN PATENT DOCUMENTS

CN 1129631 A 8/1996
CN 101268229 A 9/2008
(Continued)

OTHER PUBLICATIONS

CN_111708327_A (Year: 2020).*
(Continued)

*Primary Examiner* — Jonathan G Riley
(74) *Attorney, Agent, or Firm* — Bookoff McAndrews, PLLC

(57) ABSTRACT

The disclosure relates in particular to a method of cutting one or more draping elements in a strip of material comprising a fabric layer comprising a film on at least one face. Each draping element is delimited along a determined outline comprising at least one angle, each draping element being cut by means of a cutting blade. At each angle of the outline, the fabric layer and each one film are cut along a curve so as to obtain one or more draping elements without overcutting.

8 Claims, 4 Drawing Sheets

(56) References Cited

U.S. PATENT DOCUMENTS

| | | | | | |
|---|---|---|---|---|---|
| 4,581,965 | A * | 4/1986 | Gerber | B26D 7/1854 83/56 |
| 4,689,756 | A * | 8/1987 | Koyama | G05B 19/41 700/189 |
| 4,821,207 | A * | 4/1989 | Ming | G05B 19/41 318/568.15 |
| 4,920,495 | A * | 4/1990 | Pilkington | B26D 5/02 83/881 |
| 5,416,716 | A * | 5/1995 | Zeman | G05B 19/41 700/187 |
| 5,825,652 | A * | 10/1998 | LeBlond | B26F 1/3813 81/463 |
| 6,922,606 | B1 * | 7/2005 | Yutkowitz | G05B 19/4103 318/560 |
| 8,733,749 | B2 * | 5/2014 | Lanciaux | B26D 1/10 269/21 |
| 9,377,772 | B2 * | 6/2016 | Koide | G05B 19/40937 |
| 2001/0045148 | A1 * | 11/2001 | Gerent | B26D 5/005 83/368 |
| 2003/0230178 | A1 * | 12/2003 | Steadman | D06H 3/08 83/13 |
| 2007/0046677 | A1 * | 3/2007 | Hong | G05B 19/41 345/442 |
| 2010/0233423 | A1 * | 9/2010 | Corden | B29C 70/202 428/113 |
| 2015/0013514 | A1 * | 1/2015 | Strauss | F41H 5/0442 269/21 |
| 2015/0118449 | A1 | 4/2015 | Sugdon et al. | |
| 2015/0314583 | A1 * | 11/2015 | Jess | B25J 11/00 414/222.01 |

FOREIGN PATENT DOCUMENTS

| | | | | | |
|---|---|---|---|---|---|
| CN | 103949705 | A | | 7/2014 | |
| CN | 208910999 | U | | 5/2019 | |
| CN | 111708327 | A | * | 9/2020 | G05B 19/41 |
| DE | 29604938 | U1 | | 7/1996 | |
| DE | 10144487 | A1 | | 3/2003 | |
| FR | 2193109 | A1 | | 2/1974 | |
| FR | 2484897 | A1 | | 12/1981 | |
| GB | 2075714 | A | * | 11/1981 | B26D 5/00 |
| GB | 2268705 | A | * | 1/1994 | B26D 7/018 |

OTHER PUBLICATIONS

French Search Report in Application No. FR 1909810, dated May 29, 2020, 2 pages.

International Search Report and Written Opinion in International Application No. PCT/FR2020/051529, dated Dec. 8, 2020, 8 pages.

* cited by examiner

[Fig. 1]
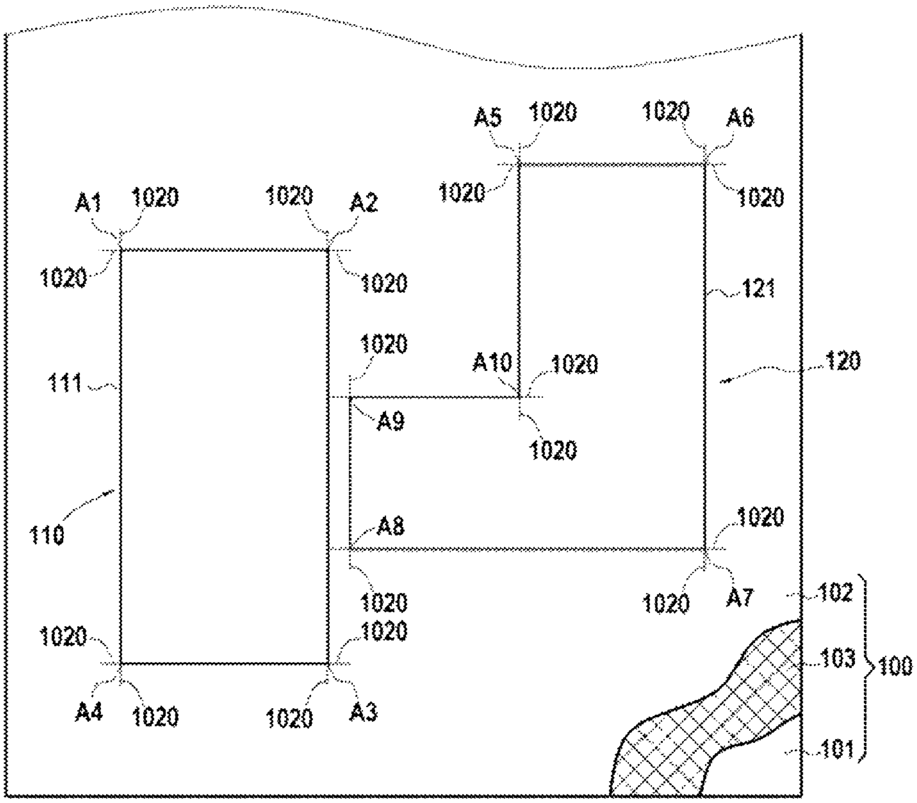

[Fig. 2]
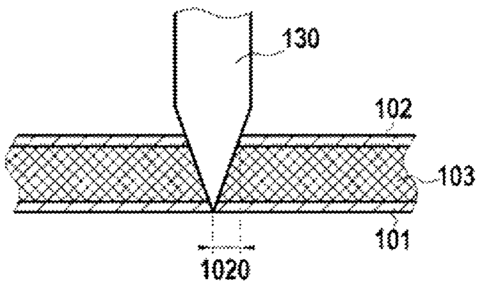
[Fig. 3]
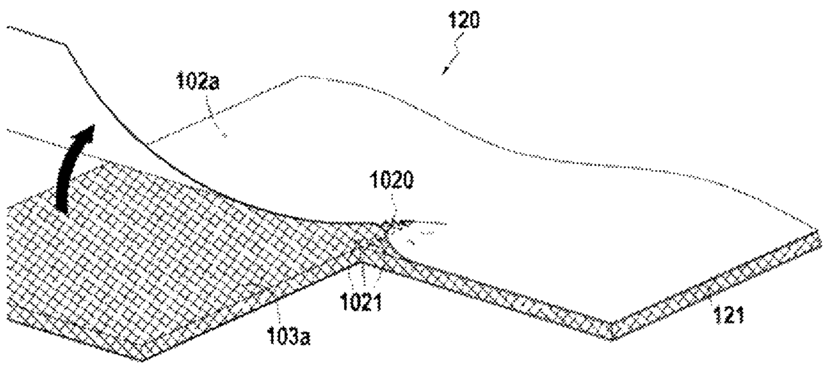

[Fig. 4]
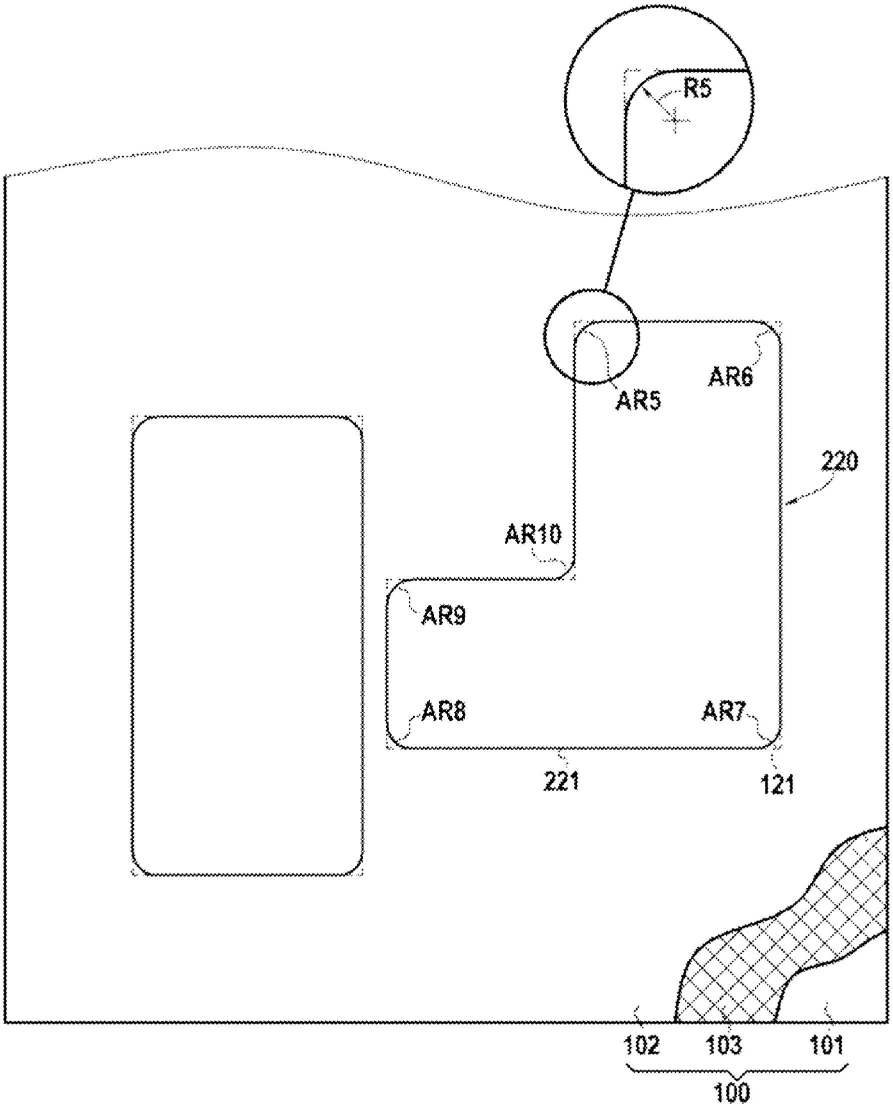

[Fig. 5]
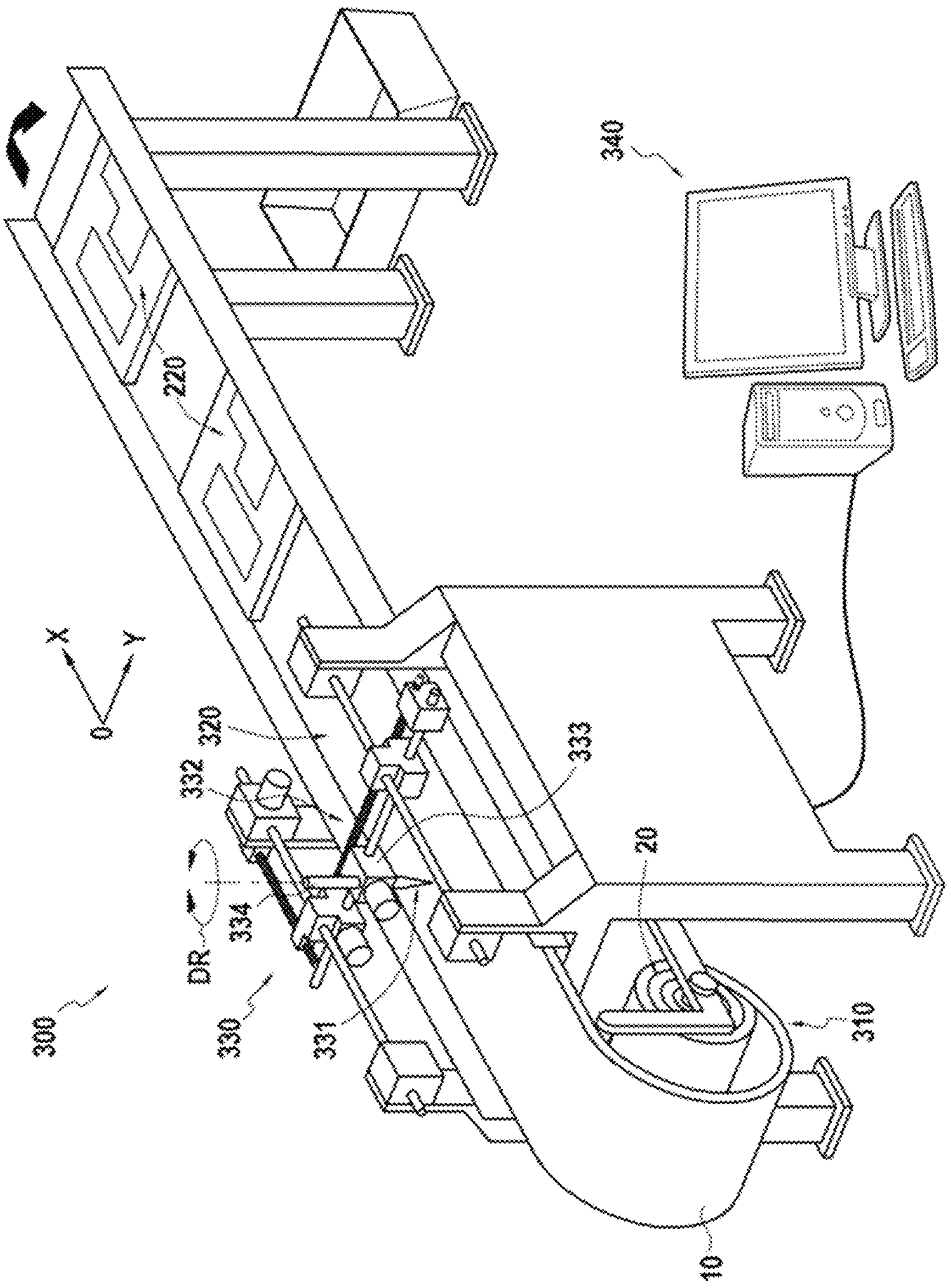

METHOD AND MACHINE FOR CUTTING DRAPERY ELEMENTS

CROSS-REFERENCE TO RELATED APPLICATION(S)

This patent application is the U.S. National Stage entry under 35 U.S.C. § 371 of International Patent Application No. PCT/FR2020/051529, filed on Sep. 3, 2020, which claims the benefit of priority to French Patent Application No. 1909810, filed on Sep. 6, 2019.

TECHNICAL FIELD

The present invention relates to the manufacture of composite material parts comprising a fibrous reinforcement formed by draping fibrous plies over a mold and densified by a matrix.

PRIOR ART

A composite material part obtained by draping consists of a stack of plies cut into a fibrous texture generally in the form of a strip. The texture consists of fibers, for example carbon, glass or Kevlar fibers, parallel to each other or woven, and pre-impregnated with resin. The sticky face(s) of the pre-impregnated texture are covered with a separator film.

Each ply of the part is defined by a geometric outline and an orientation of the material fibers within the surface defined by that outline. A ply can be made in one piece but is more commonly made up of a juxtaposition of cuts made in a pre-impregnated textile strip.

In general, a method for producing a draped part includes the following operations: definition of the cuts for each ply of the part, production of these cuts in a pre-impregnated fibrous texture, production of the part by stacking the plies, and then compacting. The last operation is the curing of the compacted draped part to polymerize the resin. It is common to make the cuts by using a cutting machine equipped with a digital control station. This allows, compared to the traditional technique, to obtain a perfect geometry and a faster cutting. These high-performance machines can cut several plies at the same time and generally allow for an optimized placement of the various cuts.

If the draping manufacturing technique allows to obtain composite material parts with excellent mechanical properties, there is however a significant risk of having foreign bodies present in the stack of plies. These foreign bodies can cause delamination in the final part, which is not acceptable for the mechanical strength of the part. However, the ply draping is performed in a clean room in order to minimize the sources of contamination. Consequently, the foreign body or bodies present in the stack are necessarily from a part of the material present in the clean room. It has been observed that the material of the separating film constituted the majority of the foreign bodies found in the contaminated ply stacks.

DISCLOSURE OF THE INVENTION

The purpose of the present invention is to overcome the aforementioned disadvantages and to provide a solution that minimizes or even eliminates the presence of foreign bodies in the plies used for draping.

To this end, the invention proposes a method of cutting one or more draping elements in a strip of material comprising a layer of fabric comprising a film on at least one face, each draping element being delimited along a determined outline comprising at least one angle, each draping element being cut by means of a cutting blade, characterized in that, at each angle of the outline, the layer of fabric and the film(s) are cut along a curve so as to obtain one or more draping elements without overcutting.

As explained in more detail below, the inventors found upon investigation that most of the foreign bodies present in the ply stack was from pieces of film(s) resulting from tears in the film(s) as they peeled off from the draping element. The inventors also determined that the overcuts in the film(s) on the fabric layer were tear initiators.

Therefore, according to the method of the invention, each angle or abrupt change of trajectory in the outline of a draping element is cut along a curve in order to allow a progressive change of direction of the cutting blade and thus avoid being stopped to lift it, orient it in the new direction and re-insert it into the fabric layer as in the prior art. As the cutting path is continuous, there are no more over-cut lines in the film(s) in contact with the fabric layer. The risks of tearing the film(s) are thus greatly reduced. In addition, the cutting method of the invention saves time compared to the cutting method in the prior art. Indeed, using the method of the invention, the cutting of the draping elements can be carried out continuously, in particular at each angle or abrupt change of direction in the cutting. This saves the time previously spent lifting, repositioning and re-inserting the blade at each change of direction.

According to a particular feature of the method of the invention, each curve has a radius of curvature greater than or equal to 1.2 mm, which facilitates continuous cutting (no need to stop the cutting to lift the blade) of each curve without forming ridges or creases in the film.

According to another particular feature of the method of the invention, each curve has a radius of curvature less than or equal to 3 mm, which makes it possible to remain as close as possible to the cutting outline so as not to generate mechanical damage by lack of material in the stack and not to generate material health problems by peeling off between a support (e.g. honeycomb) and a composite skin which would have a hollow in the area of contact with the support.

According to another particular feature of the method of the invention, the fabric layer is a layer of fibers pre-impregnated with a resin comprising on at least one face a separator film.

The invention also relates to a machine for cutting draping elements comprising a device for feeding a strip of material comprising a layer of fabric and at least one film present on one of its faces, a cutting system comprising a cutting blade mounted on a motorized mechanism adapted to move the cutting blade in several directions in the strip of material and a control unit connected to the motorized mechanism so as to control the movements of the cutting blade in the strip of material along a determined cutting outline comprising at least one angle, characterized in that the control unit is configured to control the cutting of the strip of material along a curve at each angle of the outline so as to obtain a draping element without overcutting.

According to a particular feature of the machine of the invention, each curve has a radius of curvature greater than or equal to 1.2 mm.

According to another particular feature of the machine of the invention, each curve has a radius of curvature less than or equal to 3 mm.

According to another particular feature of the machine of the invention, the fabric layer is a fiber layer pre-impregnated with a resin comprising on at least one face a separating film.

BRIEF DESCRIPTION OF THE DRAWINGS

FIG. 1 is a schematic top view showing two draping elements cut in a strip of material according to the prior art, FIG. 2 is a schematic cross-sectional view showing the cutting of a draping element from FIG. 1, FIG. 3 is a schematic perspective view showing the removal of a film from a draping element of FIG. 1, FIG. 4 is a schematic top view showing a draping element cut in a strip of material in accordance with one embodiment of the invention, FIG. 5 is a schematic perspective view of a cutting machine according to one embodiment of the invention.

DESCRIPTION OF THE EMBODIMENTS

In general, the invention applies to the cutting of plies or strata in a strip of material comprising a dry or pre-impregnated fabric layer and having on at least one of its faces a film which is cut at the same time as the fabric layer. The invention has a particular application in the manufacture of composite material parts by draping fibrous plies pre-impregnated with a matrix precursor resin.

The plies used in the production of a composite material part by draping are previously cut out of a layer of fabric generally pre-impregnated and in the form of a strip covered on one or both faces with a separating film avoiding direct contact with the layer which is sticky or tacky due to its impregnation with a resin. When the plies are draped on a draping mold, an operator peels off the film portion(s) present on the face(s) of the draping element.

The inventors have found that the material of the separator film(s) present on the face(s) of the fabric layer from which the draping elements are cut constitutes the majority of the foreign bodies found in ply stacks after draping thereof. The draping elements consist of a portion of the fabric layer with a portion of film on one or both faces.

The inventors then studied the various manufacturing steps in order to identify why these pieces of film appear in the stack of plies. The inventors found that the cutting of the draping elements according to the prior art resulted in over-cuts that can form tear initiators in the film when removed (peeled off) by an operator before the ply is draped. Cutting according to the prior art is performed with a motorized cutting blade which, at each abrupt change of trajectory, is lifted, oriented in the new cutting direction and re-inserted into the layer to be cut. FIG. 1 illustrates a material strip 100 consisting of a fabric layer 103 comprising on its underside a first film 101 and on its top side a second film 102. Two draping elements 110 and 120 were cut from the strip 100 according to the prior art cutting technique described above using a cutting blade 130 (FIG. 2). The draping element 110 was cut along an outline 111 comprising four angles A1 to A4 or abrupt changes in direction. Similarly, draping element 120 was cut along an outline 121 comprising six angles A5 through A10 or abrupt changes in direction. As noted above, at each of these angles, the cutting blade was lifted, oriented in the new cutting direction, and re-inserted into the strip of material 100.

The triangular shape of the cutting blade 130 (FIG. 2) as well as the positioning tolerances defined at each angle to ensure the complete cutting of each draping element generate overcuts of a few millimeters in the films 101 and 102 at the angles of the cutting outline. In FIG. 1, only overcuts 1020 present in the second film 102 are shown. The overcuts 1020 present in the second film 102 are essentially generated by the triangular shape of the cutting blade and, to a lesser extent, by the positioning tolerances of the blade, whereas the overcuts present in the first film 101 (not shown in FIGS. 1 and 2) are generated by the positioning tolerances of the cutting blade.

At each angle, two overcuts are present in each film, a first overcut corresponding to an overcut length when the blade reaches an angle of the cutting outline and a second overcut corresponding to an overcut length when the blade is re-inserted into the material strip 100 after being lifted and reoriented. This ensures that the draping element is completely cut out of the strip 100 at each angle or abrupt change in cutting direction.

Overcuts in the film(s) present on one or both faces of the fabric layer are potential initiators of tears in the films as they are peeled off from the cut portion of fabric to form a draping element. As illustrated in FIG. 3, upon removal (peeling off) by an operator of the film portion **102*a* present on the top of the draping element 120, tears occur at overcuts 1020, resulting in the deposition of film pieces 1021 on the fabric portion 103*a* of fabric present in the draping element 120. Some or all of the film pieces 1021 may then be found in the final part after draping of the fabric portion 103*a***.

In addition, when two draping elements are cut into the material strip at close locations, which is often the case to optimize material use, overcuts of one draping element can propagate into the adjacent draping element and create additional tear initiators in it.

After identifying why pieces of film were present in the draped plies, the inventors developed a new cutting method to allow removal of the film(s) present on the draping elements without risk of tearing.

The cutting method of the invention makes it possible to obtain draping elements without overcuts. To this end, according to the cutting method of the invention, each angle or abrupt change of trajectory in the outline of a draping element is cut along a curve in order to allow a gradual change of direction of the cutting blade and thus prevent it from being stopped to lift it, orient it in the new direction and re-insert it into the layer of fabric as in the prior art. As the cutting trajectory is continuous, there are no more over-cut lines in the film(s) in contact with the fabric layer. The risks of tearing the film(s) are greatly reduced. Another advantage of the cutting method of the invention relates to the time saving compared to the cutting method of the prior art. Indeed, with the method of the invention, the cutting of the draping elements can be carried out continuously, in particular at each angle or abrupt change of direction in the cutting. This saves the time previously spent lifting, repositioning and re-inserting the blade at each change of direction.

FIG. 4 illustrates the cutting of a draping element 220 having a shape similar to the draping element 120 in that its outline 221 defining the cutting path corresponds generally to the outline 121 of the draping element 120. However, in accordance with the invention, the portions of the outline 221 present at the angles A5 and A10 of the outline 121 (FIG. 1) include respective curves AR5 to AR10. Thus, by following the io curves AR5 to AR10, the blade can cut the entire draping element 220 continuously, i.e., without interruption of cutting during even abrupt changes of direction, resulting in a draping element 220 without any overcutting.

Each curve is cut according to a determined radius of curvature such as the radius of curvature R5 of the curve AR5 illustrated in FIG. 4. The radius of curvature of each curve is preferably greater than or equal to 1.2 mm in order to facilitate continuous cutting (no need to stop cutting to lift the blade) of each curve without forming ridges or creases in the film. Moreover, the radius of each curve is preferably less than or equal to 3 mm in order to remain as close as possible to the cutting outline and thus not generate mechanical damages due to lack of material in the stack. Furthermore, this prevents the generation of material health problems by peeling off between a support, such as a honeycomb, and a composite skin which would have a hollow in the area of contact with the support.

FIG. 5 illustrates a digitally controlled cutting machine 300 in which the method of the invention is implemented. In a known manner, the cutting machine 300 comprises a feeding device 310 comprising a strip of material 10 stored on a roll 20, the material strip here consisting of a layer of fabric pre-impregnated with a resin and two separator films present respectively on one of the faces of the layer (not shown in FIG. 5). The cutting machine 300 also includes a cutting table 320 present downstream of the feeding device 310 and a cutting system 330 comprising a cutting blade 331 mounted on a motorized mechanism 332 configured to move the cutting blade along several directions. More specifically, the motorized mechanism 332 includes a carriage 333 for moving the blade 331 along a path defined in a reference frame (0; x; y), the cutting blade 331 further being mounted on the carriage 333 via a shaft 334 for orienting the blade in a dual direction DR to facilitate the cutting of curves. The cutting machine 300 further comprises a control unit 340 connected to the motorized mechanism 332 and configured to control the movements of the blade along a determined cutting outline. For this purpose, the control unit 340 is programmed from templates generated, for example, by means of computer-aided design and manufacturing (CAD/CAM) software, the templates each defining a cutting outline of a draping element in a strip of material in which each angle is cut along a curve in accordance with the present invention. For example, the cutting machine 300 is adapted to cut the draping element 220 along the outline 221 comprising the curves AR5 to AR10. According to one embodiment, the control unit may be programmed to correct sharp angles or the like present in an initial rounded angle cutting trajectory during cutting.

The invention claimed is:

1. A method of cutting at least one draping element in a strip of material comprising a fabric layer comprising a film on at least one face, the at least one draping element being cut along a determined outline comprising at least one curve, the at least one draping element being cut by means of a cutting blade, wherein said method comprises:

generating a template defining a cutting outline of said at least one draping element, the cutting outline including the at least one curve;

cutting the at least one draping element along the defined cutting outline wherein, the fabric layer and the film are cut along the at least one curve;

identifying, while cutting the at least one draping element along the defined cutting outline, at least one angle on the cutting outline; and automatically replacing the at least one angle with a curve such that the fabric layer and the film are cut along the curve so as to obtain the at least one draping element without overcutting.

2. The method according to claim 1, wherein each curve has a radius of curvature between 1.2 mm and 3 mm.

3. The method according to claim 1, wherein the fabric layer is a layer of fibers pre-impregnated with a resin.

4. A machine for cutting draping elements comprising a device feeding a strip of material, wherein the strip of material comprises a fabric layer, wherein the fabric layer includes a plurality of faces, and a film present on one of the faces of said fabric layer, a cutting system comprising a cutting blade mounted on a motorized mechanism configured to move the cutting blade in several directions in the strip of material and a control unit connected to the motorized mechanism so as to control movements of the cutting blade in the strip of material along a determined cutting outline comprising at least one curve, wherein the control unit is configured to be programmed from a template defining a cutting outline of the draping elements in the strip of material in which the at least one curve is defined to be cut along the at least one curve and to control cutting of the strip of material along the defined cutting outline, wherein the control unit is further configured to identify, while cutting the at least one draping element along the defined cutting outline, at least one angle on the cutting outline and automatically replace the at least one angle with a curve such that the fabric layer and the film are cut along the curve so as to obtain the at least one draping element without overcutting.

5. The machine according to claim 4, wherein each curve has a radius of curvature between 1.2 mm and 3 mm.

6. The machine according to claim 4, wherein the fabric layer is a layer of fibers pre-impregnated with a resin comprising on at least one face a separator film.

7. The machine according to claim 4, wherein the motorized mechanism includes a carriage configured to move the cutting blade along a path defined in a reference frame.

8. The machine according to claim 7, wherein the cutting blade is mounted on the carriage via a shaft, wherein the shaft is configured to orient the cutting blade in a dual direction to cut curves along the cutting outline.

* * * * *